US007606726B2

(12) United States Patent
Nelson (10) Patent No.: US 7,606,726 B2
(45) Date of Patent: Oct. 20, 2009

(54) INTERACTIVE SURVEY AND DATA MANAGEMENT METHOD AND APPARATUS

(75) Inventor: Eugene C. Nelson, Norwich, VT (US)

(73) Assignee: Quality Data Management Inc., Cleveland, OH (US)

( * ) Notice: Subject to any disclaimer, the term of this patent is extended or adjusted under 35 U.S.C. 154(b) by 678 days.

(21) Appl. No.: 09/871,279

(22) Filed: May 31, 2001

(65) Prior Publication Data
US 2002/0120491 A1 Aug. 29, 2002

Related U.S. Application Data

(60) Provisional application No. 60/208,364, filed on May 31, 2000.

(51) Int. Cl.
*G06F 17/30* (2006.01)
(52) U.S. Cl. .................. 705/10; 705/1; 379/265.13; 379/210.01
(58) Field of Classification Search .......... 705/10, 705/1; 379/265.13, 210.01
See application file for complete search history.

(56) References Cited

U.S. PATENT DOCUMENTS

| 5,309,505 | A | * | 5/1994 | Szlam et al. ............. 379/88.01 |
| 5,414,754 | A | * | 5/1995 | Pugh et al. ............... 379/88.23 |
| 5,517,405 | A | * | 5/1996 | McAndrew et al. ........... 706/45 |
| 5,703,935 | A | * | 12/1997 | Raissyan et al. .......... 379/88.18 |
| 5,706,441 | A | | 1/1998 | Lockwood ................ 395/203 |
| 5,764,923 | A | | 6/1998 | Tallman et al. ............. 395/203 |
| 5,884,032 | A | * | 3/1999 | Bateman et al. ............ 709/204 |
| 5,893,098 | A | * | 4/1999 | Peters et al. ................ 707/10 |
| 5,924,073 | A | | 7/1999 | Tyuluman et al. ............. 705/2 |
| 5,943,416 | A | * | 8/1999 | Gisby ................... 379/265.13 |
| 6,032,177 | A | * | 2/2000 | O'Donnell ................ 709/204 |
| 6,151,581 | A | | 11/2000 | Kraftson et al. .............. 705/3 |
| 6,381,744 | B2 | * | 4/2002 | Nanos et al. ................ 725/24 |
| 6,477,504 | B1 | * | 11/2002 | Hamlin et al. .............. 705/10 |
| 6,480,599 | B1 | * | 11/2002 | Ainslie et al. .......... 379/265.02 |
| 6,564,207 | B1 | * | 5/2003 | Abdoh ..................... 707/3 |
| 6,807,274 | B2 | * | 10/2004 | Joseph et al. .......... 379/265.01 |

OTHER PUBLICATIONS

McLaughlin, Rachel. "Surveying customer satisfaction". Target Marketing. Philadelphia: Feb. 1999. Vol. 22, Iss. 2—proquest.*
Jolls, Tessa. Technology continues to redefine HR's role. Workforce, v76, n7, p. 46 Jul. 1997.*
Friesen, Brandon; Jainschigg, John. Business Neurology 101. Computer Telephony, v7, n6, p. 58. Jun. 1999.*
Caldwell, Chip. Frontiers of Health Services Management. v15 n1 p. 35-39 Fall 1998.*

* cited by examiner

*Primary Examiner*—Bradley Bayat
*Assistant Examiner*—Johnna Loftis
(74) *Attorney, Agent, or Firm*—Pearne & Gordon LLP (57) ABSTRACT

An interactive survey and data management method and apparatus for collecting and processing survey information in which a questioning series of core item questions is asked of a sample participant and only when a core item response is within a predetermined range a second questioning series of drill-down questions that enable a more focused survey is then asked of the sample participate, otherwise the survey continues with the core item questions. The second questioning series may also contain open-ended questions called verbatims where the survey participant may give a detailed response to further explain an answer.

10 Claims, 5 Drawing Sheets

INTERACTIVE SURVEY AND DATA MANAGEMENT METHOD AND APPARATUS

This application claims the benefit of U.S. Provisional Application 60/208,364 filed May 31, 2000. This application is also related to co-pending application INTEGRATED COMMUNICATION SYSTEM AND METHOD, Nelson et al., Ser. No.: 09/871,420, filed on May 31, 2001 and incorporated herein by reference.

FIELD OF INVENTION

The present invention relates to collecting and managing customer satisfaction survey information that enables a product or service provider to evaluate the quality of goods and services based on survey ratings and reports from customers.

BACKGROUND OF THE INVENTION

Conventional approaches to access customer satisfaction information generally use standard survey forms or questionnaires by mail or telephone. A survey participant may be mailed a standard survey form to complete and return by mail or an agent of the provider may call a participant so that the survey questions may be answered over the telephone.

However, these methods of performing surveys are inaccurate and inefficient, often taking considerable time to collect and process the information. For example, a traditional direct mail survey may take more than 100 days before a provider reviews a final report and the survey participants may not even be recent users of the products or services. A direct mail process normally determines a random survey sample from a customer data base provided by disk from the product or service provider. An initial seven to fourteen days may be allowed for sending a pre-notification letter and a direct mailing of the survey to each survey participant. Then, reminder cards to complete the survey are sent to non-respondents after ten days with a second direct mailing being sent after an additional thirty days. Once the direct mail effort is completed, telephone interviews may also be performed to meet the response rate quota. A final report is only sent to the product or service provider two to three weeks after attaining the required response rate quota.

Furthermore, although computers are likely to be used to analyze the survey data, human agents are still typically used to enter the data into a computer or to perform the actual survey questioning in both traditional mail and telephone surveys. Unfortunately, human agents are expensive to hire, increasing survey costs, and humans often make mistakes, leading to survey inaccuracies.

One possible solution involves using computer-operated surveys where the participant uses the touch-tone feature of a telephone to enter replies to questions. Such a system, however, seems impersonal to the participant, often leads to mistakes if the participant forgets the key/answer mapping, and is limited to the use of touchtone telephones. Such a solution also does not provide an adequate means to obtain actual participant verbal responses to questions. Actual recorded verbal responses have the advantage of capturing the participant's subjective tone and emotional state, as well as capturing the participant's objective opinion.

It would be advantageous to automate the survey process to reduce the number of human beings utilized in the survey process, to increase the accuracy, reduce the costs, improve the efficiencies, and overcome the shortcomings of current techniques identified above. Modem computer and networking technology provides potential solutions to these problems. Advances in voice recognition, database design, computer processing, and computer networking all provide means to improve the process of performing a survey.

In addition, because all survey participants tend to be asked the same pre-determined list of questions, little insight into the particular reasons behind the answers are typically available. Conventional means of solving this problem may involve having a longer, more complex survey or having the participant state a reason for his or her answer. However, the provider of a survey assessment may only be interested in detailed reasons behind an answer in particular situations, such as when a participant is very dissatisfied with a service or product, while the same provider may not care why a survey participant was satisfied with a different service or product. A longer complex survey causes a participant to become frustrated at the relevancy and time commitment involved in completing the survey, thus, encouraging the participant not to complete the survey fully or to end the survey prematurely. Likewise, processing stated "reasons" using standard techniques can be difficult, time-consuming, and costly.

Conventional written surveys attempt to solve this process, for example, by telling a participant to "skip section X if you answered 'no' to question Y" or to "complete section Q only if you answered 'poor' to question T". Telephone or surveys often require the survey agent to follow similar instructions. This can be confusing and frustrating to participants and agents alike, often leading to errors or incomplete surveys. More sophisticated, automated survey techniques that depend on neither the participant nor the agent's understanding of the survey structure would be advantageous.

Accordingly, an adaptable survey questioning procedure would be useful, one that determines the depth of questioning on certain topics depending on the answers given to questions on that topic, and that utilizes computer technology to process verbal replies. Better utilization of modem computers and software and the reduction in the reliance of human agents on performing the survey questioning would be beneficial to the product and service providers and the survey participants, as well as any agents performing the surveys.

BRIEF SUMMARY OF THE INVENTION

According to the present invention, an interview system includes a questioning series of core item questions and a second questioning series of drill-down questions that are provided only when a previous response is within a predetermined range to enable a more focused survey. The second questioning series may also contain open-ended questions called verbatims where the survey participant may give a detailed response to further explain an answer.

The invention provides a system of collecting survey information. The system includes a first questioning series of core item questions developed to support a survey purpose. A second questioning series of drill-down questions is provided wherein each of the drill-down questions is associated with one of the core item questions and one of the drill-down questions is presented only when a response to the associated core item question meets a specified criterion.

The system is an automated system. The second questioning series contains at least one verbatim question presented only when a response to a previous question meets a specified criterion and wherein a detailed response to the verbatim question may be given to further explain the response to the previous question. The system includes a device for recording a response to a verbatim question literally.

The invention also provides a method of collecting and managing survey data. The steps include presenting a first core item question and recording a response to the first core item question; interpreting the first core item response; presenting at least one drill-down question and recording a response to the drill-down question only if the first core item response meets specified criterion; and presenting a second core item question and recording a response to the second core item question.

Additional steps include interpreting the response to the drill-down question; and presenting at least one verbatim and recording a verbatim response if the drilldown response is not within the predetermined acceptable response range. Other steps include presenting a second drill-down question and recording a response to the second drill-down question only if the response to the one drill-down question meets a specified criterion; and presenting a second core item question and recording a response to the second core item question.

Further steps include presenting at least one unrelated verbatim and recording an unrelated verbatim response, wherein the unrelated verbatim does not depend upon a previous response.

DETAILED DESCRIPTION OF THE INVENTION

The interactive survey and data management method and apparatus collects and manages information on a technology platform that fully integrates data collection, data computation, and data presentation into one system. Unlike traditional data collection processes, the interactive survey-based interview is generally only a six to twenty-five day cycle.

Figure 1:
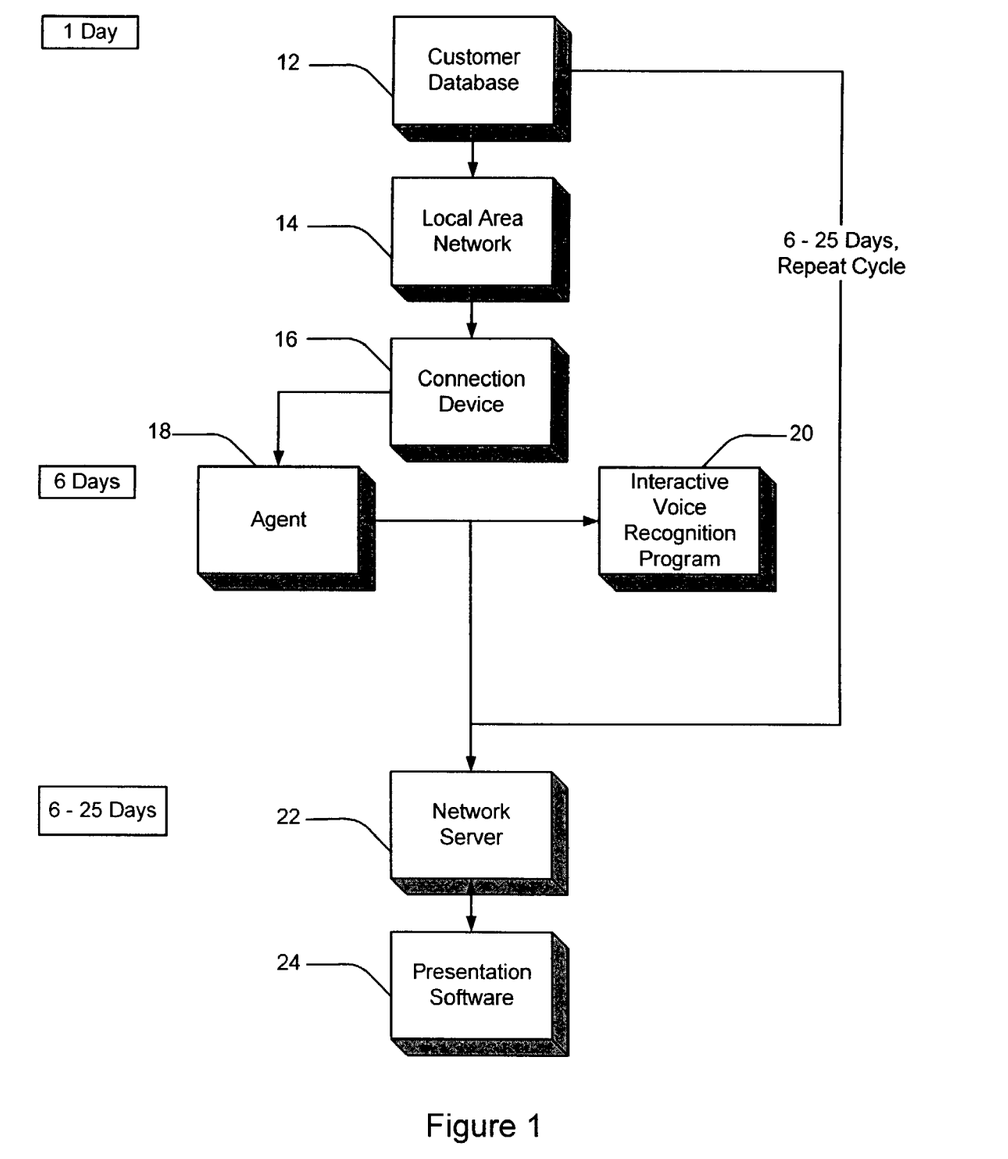
FIG. 1 is a block diagram showing the technology platform upon which an embodiment of the present invention operates.

As shown in FIG. 1, the major components of the communication system involved with the interactive survey-based interview include a customer database 12, a local area network 14, a connection device 16, a computer-assisted interview agent 18, an interactive voice recognition program with speech recognition 20, a network server 22, and a presentation software or unit 24 that can be accessed by a computer by the internet or other private network.

The customer database 12 contains current uses of the provider's product or services and is generally updated on a daily or weekly basis. The local area network 14 provides automated database interchange between a provider's computer and a main system computer to collect survey information such as demographic profiles of members of a survey sample, costs, or clinical and biological outcome data. The communication device 16, a dialer when a telephone interface is used, is an automated outgoing call device that dials a programmed series of participant telephone numbers at scheduled times and transfers a call to an agent 18 when a participant answers.

Figure 2:
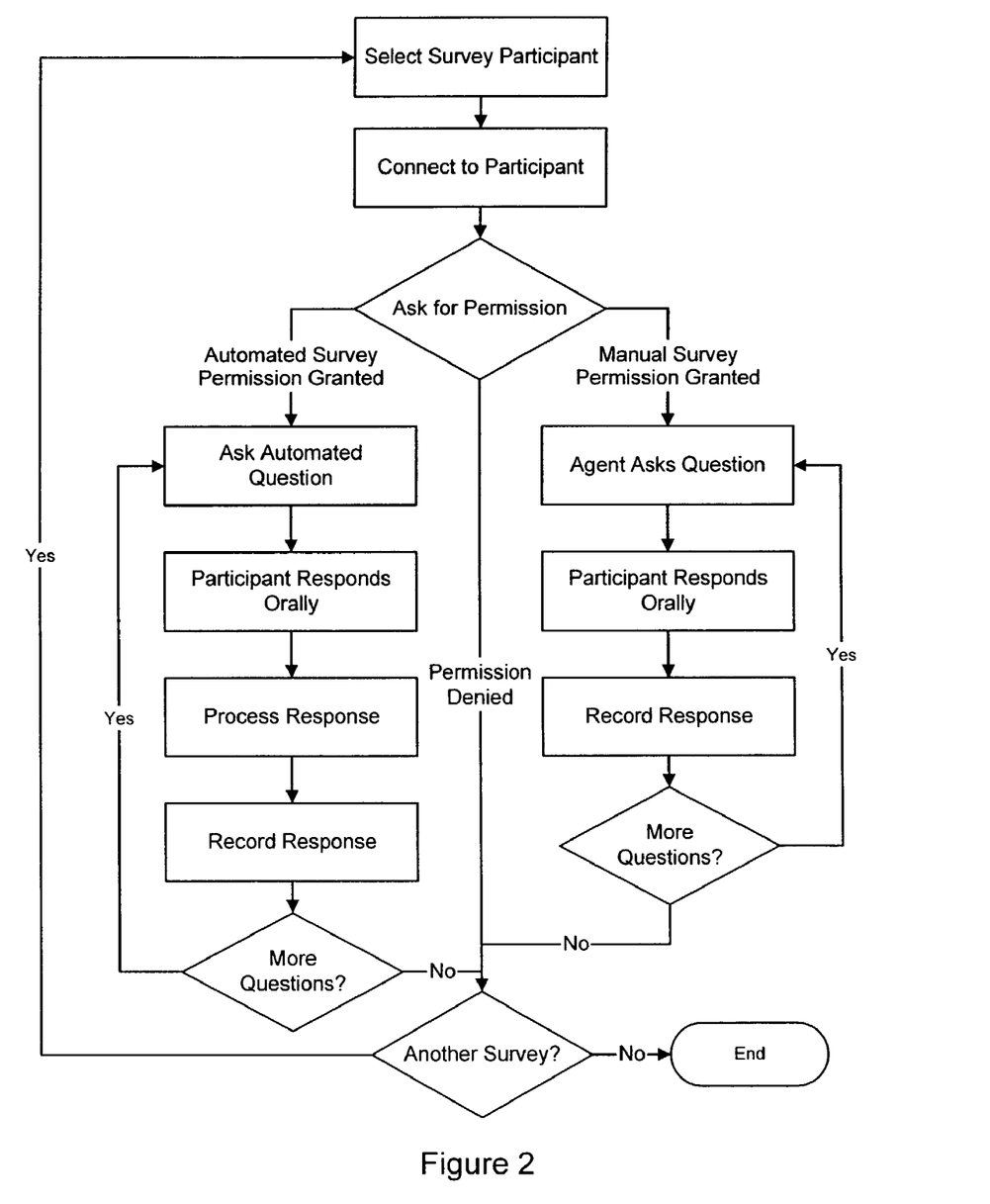
FIG. 2 is a flow chart describing the survey process with a survey participant.

The agent 18 is a trained call center agent assisted by a computer telephony interface (not shown) which creates a "call record" that follows the routing of each outgoing and incoming call and provides instantaneous "pop screens" to agents for fielding surveys. As shown in FIG. 2, the agent uses a computer terminal to a start survey by introducing the participant to a survey before transferring the participant to the interactive voice recognition unit 20 to complete an automated survey. Only oral responses are required by the participant because speech recognition technology is used. Thus, there are no touch-tone functions which may confuse or frustrate the participant. Furthermore, the speech recognition technology provides an adequate means to obtain actual participant verbal responses to questions when necessary. If the participant prefers a human agent, the agent follows the same question pattern as the one that is programmed for the automated survey. The participant may also transfer back to an agent at anytime during an automated survey to ask the agent a question or to complete the survey with the agent. The agent might intervene based on a notification triggered by the participant's responses, lack of response, or some other criterion.

The network server 22 provides the product or service provider with remote access to data collected within twenty-four hours of its collection across a virtual private network, which keeps all data off the public internet and ensures privacy and security. This server authenticates the end user for access and encrypts and de-encrypts data transferred to the survey presentation unit 24 on which the outcome measurements presentation operates and where all archival and dynamic data is stored. The communication system is more fully discussed in co-pending application INTEGRATED COMMUNICATION SYSTEM AND METHOD, Nelson et al., Ser. No.: 09/871,420 filed on May 31, 2001, and incorporated herein by reference.

Figure 3:
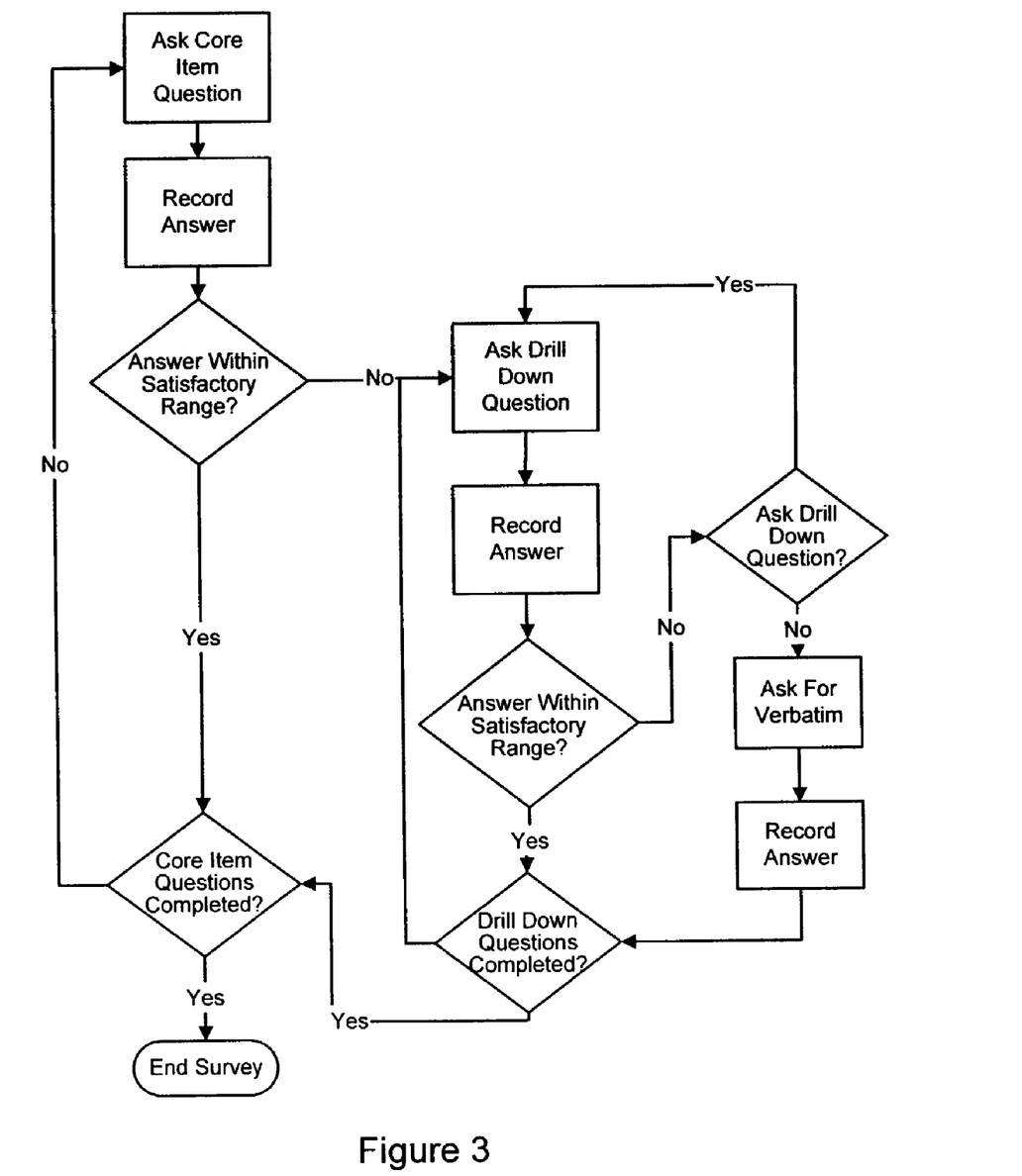
FIG. 3 is a flow chart illustrating an example of an embodiment of the present invention.

An interactive survey-based interview uses a random sample for the survey that may be either a daily or weekly sample from users of the product or service. The interviews usually begin within 72 hours of the service and approximately five attempts per sample member are made to conduct an interview during the next six to twenty-five days. Depending on the type of survey information required, the interview process cycle may then repeated using a new random sample. Finally, the data collected each day is available within twenty-four hours by the network server and may be viewed at the provider's computer terminal by the Internet. An interactive survey is tailored or customized according to the actual responses of the participant. As shown in FIG. 3, a flow chart illustrates an example of an interactive survey, where drill-down questions and open-ended questions called "verbatims" are deployed by the survey only when the response meets specified criteria, for example, when the response is not within a predetermined satisfactory range. Such a survey may be use with the communication system describe previously or with other electronic and computer-related devices including hand-held devices and the Internet. Verbatims are questions for which a response selecting from multiple choice options is not desired or expected to be appropriate. The verbal response of the participant to a verbatim question is recorded literally, for example, by a digital audio recording to be played back later.

This survey format enables the survey to go into more detailed questioning only when a certain response is given by the survey participant. If the response is within the satisfactory range of answers and no additional information is necessary, the survey proceeds to the next standard survey question. However, if the response is not within the satisfactory range of answers, only then is a drill-down question asked of the survey participant. Furthermore, if a drill-down question response is not within a satisfactory range, the survey may then proceed to ask for a verbatim response to explain a previous response in even greater detail before asking the next standard survey question. Drill-down questioning may include one question or a series of questions depending on the detail needed. Likewise, one or more verbatims may be asked of a participant depending if additional questioning on a specific topic is necessary. This flexibility allows a survey to focus on positive or negative responses and to mix qualitative and quantitative questions. Thus, the survey gathers greater detail information only when necessary, enabling the survey to be as short as possible for each survey participant.

Figure 4:
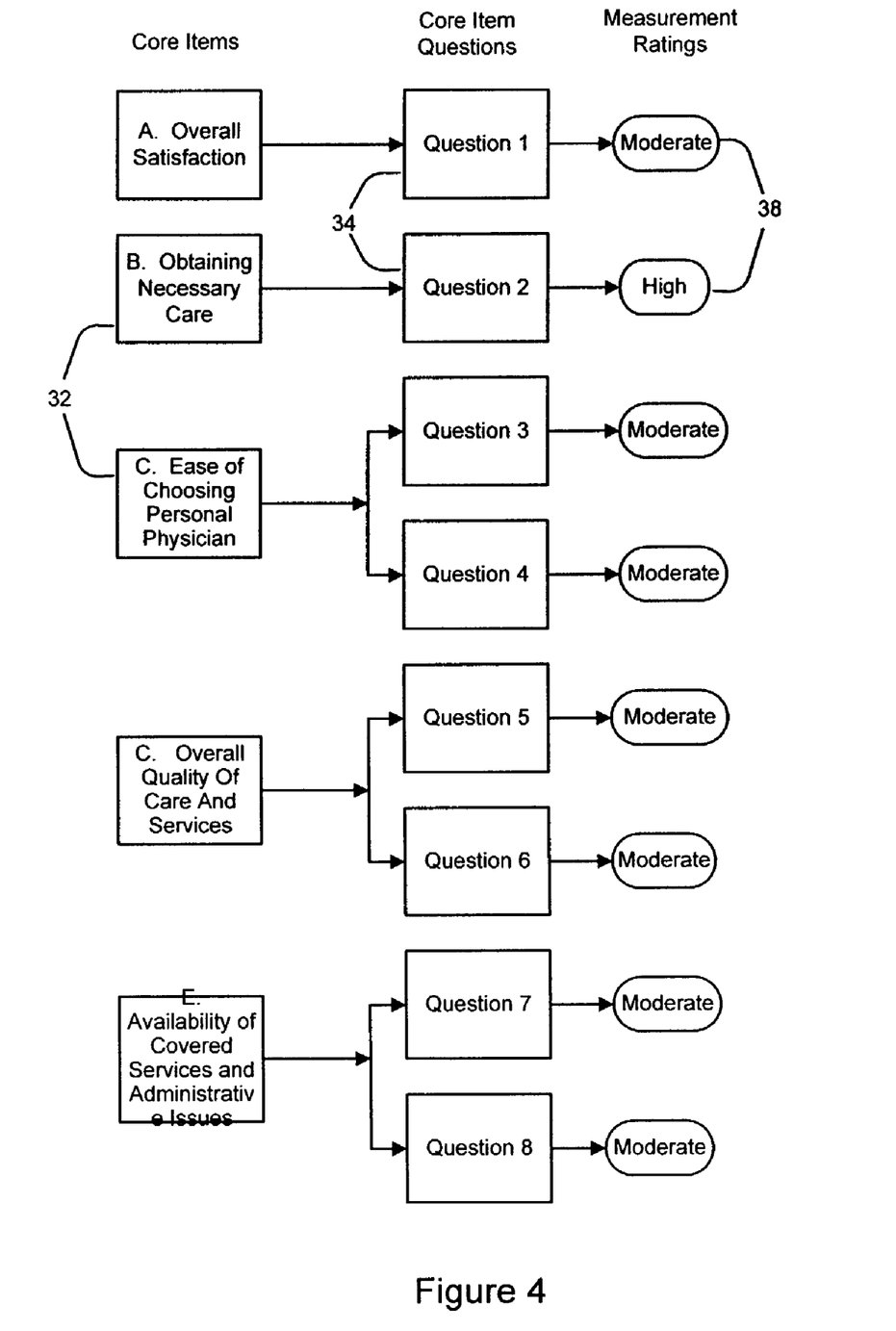
FIG. 4 is a block diagram showing an survey with responses that did not need greater detail.
Figure 5:
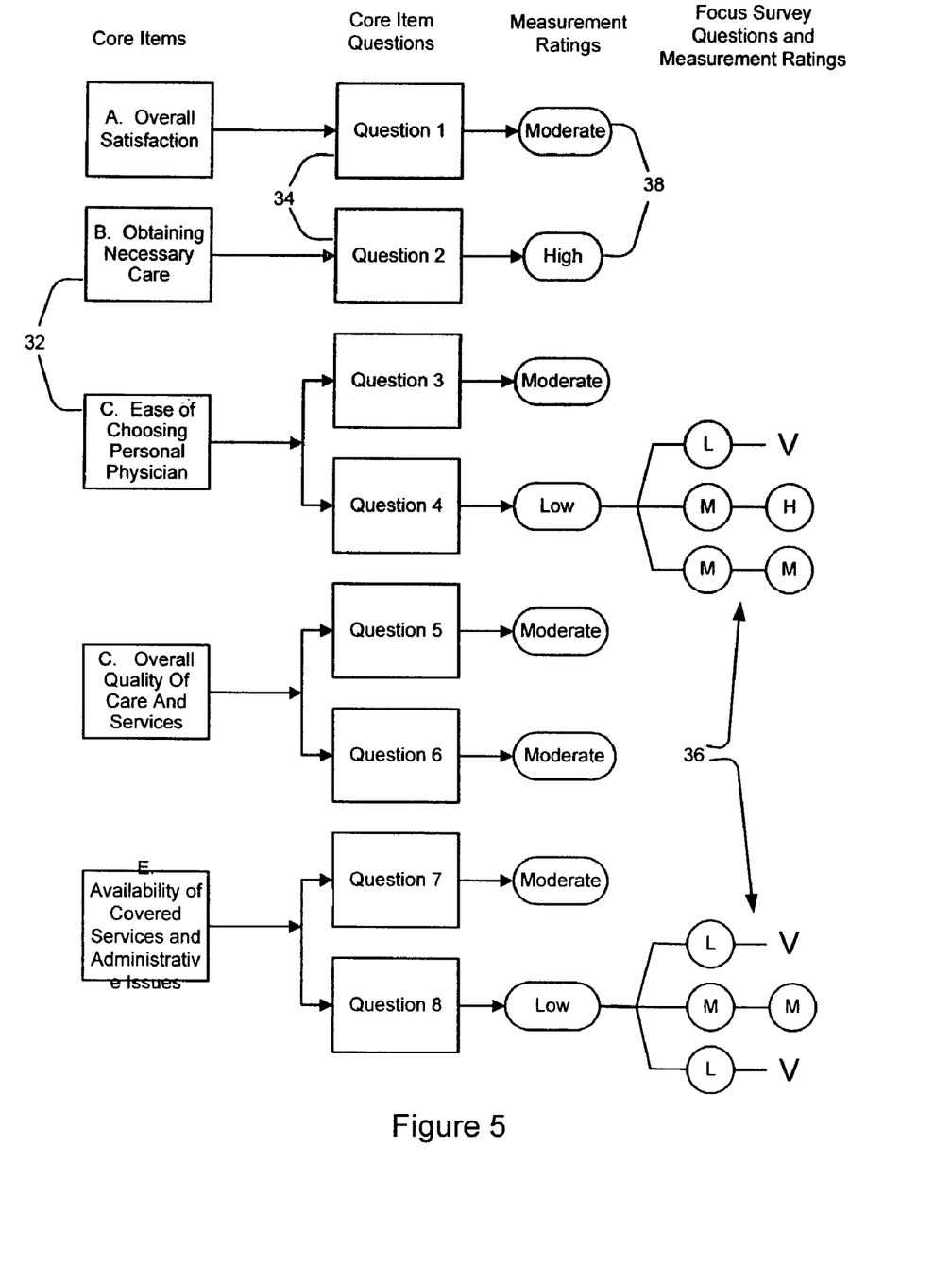
FIG. 5 is a block diagram illustrating a survey which necessitated drill-down questions and verbatims for greater detail.

Referring to FIGS. 4 and 5, an example of an interactive survey is presented using a simulated eight-question standard survey for health plans. The standard survey asked of plan participants are divided into five core items 32 or areas of measurement. Each question 34 is linked to one of the five core items 32. Focus or mini surveys 36 are also developed for each core item where a provider would want more details to a response, for example, to determine what type of performance deficiency has occurred within the core item. These focus surveys contain the drilldown questions and verbatims. In FIG. 4, the focus survey were not necessary because all the measurement ratings 38 by the survey participant are within the predetermined acceptable response range of high or moderate satisfaction level.

In FIG. 5, another survey participant gave low measurement rating to Questions 4 and 8. Using the interactive survey approach, focus or mini surveys are then deployed for these questions that receive a low recommendation. Question 4 asks five drill-down questions and one verbatim; Question 8 asks four drill-down questions and two verbatims. Thus, the drill-down questions extend the standard survey to measure in more detail the response of the previous question. From these focus surveys, the health provider would be able to learn in detail the cause of low ratings in response to Questions 4 and 8. With this detailed information, the provider would be able to develop a quality and performance improvement plan to identify corrective actions and process changes.

As a result of ongoing quality improvement efforts, the performance of the health provider should improve and subsequent surveys should result in higher rating. As improvements are made, the focus surveys can be changed or redesign to measure this change or be suspended for certain core items.

While the invention has been described with reference to a specific embodiment, various changes may be made and equivalents may be substituted for elements thereof by those skilled in the art without departing from the scope of the invention. In addition, other modifications may be made to adapt a particular situation or method to the teachings of the invention without departing from the essential scope thereof. The present invention herein is not to be construed as being limited, except insofar as indicated in the appended claims.

What is claimed is:

1. A computerized surveying system for collecting survey information comprising:
   a communication device that initiates establishment of a communication channel between the system and a survey participant for presenting a question to the survey participant about a product, a service, or a product and a service with which the survey participant has experience;
   a server for serving a first questioning series of core item questions developed to elicit feedback from the survey participant regarding the product, service, or product and service; and wherein
   said server is also for serving a second questioning series of drill-down questions, wherein each one of the drill-down questions is associated with one of the core item questions or another drill-down question and is presented only when a response to the associated question meets a specified criterion;
   an interactive voice recognition unit including a computer for executing software for providing said questions to the survey participant in a verbal manner, wherein said interactive voice recognition unit also receives the responses to said questions in a verbal manner;
   a database server for storing survey participant answers to said core item questions and/or said drill-down questions communicated to the interactive voice recognition unit via the communication channel established for presenting the question to the survey participant; and
   a survey presentation unit including a computer for executing software for automatically formatting and presenting said survey participant answers as a survey result to a user, wherein
   a verbatim question is served to the survey participant by said server when a response to a previous question meets a specified criterion but no verbatim question is provided if the response does not meet the specified criterion, and wherein
   said survey system includes a voice recorder for digitally recording said verbatim answer given by the survey participant for audio playback to the user.

2. The system of claim 1, further comprising a display for presenting said questions to an agent, wherein said system monitors said answers of the participant and switches to a manual survey mode if the participant requests a transfer to said manual survey mode or said system switches to said manual survey mode in response to an evaluation of one or more of said answers of the participant or in response to a lack of an expected answer of the participant, and wherein said server serves the same questions to the agent that said server would automatically present to the participant so that the agent can present said same questions to the participant.

3. The System of claim 2, wherein the user is validated by said system prior to said survey result.

4. The system according to claim 1, wherein the communication device is an automated outgoing call device that dials a programmed series of participant telephone numbers at scheduled times.

5. A method of using a computerized survey system including at least one computer for collecting and managing survey data comprising the steps of:
   using the computerized surveying system for initiating a process of establishing communication with a survey participant, wherein
   said survey participant is randomly selected from a pool of potential participants who had been provided a product or service within 72 hours of said initiating by the computerized surveying system;
   using the computerized surveying system for presenting a first core item question about a product, a service, or a product and a service with which the survey participant has experience to the survey participant and recording a response to the first core item question in a database;
   using the computerized surveying system for automatically interpreting the first core item response for meeting a specified criterion;
   using the computerized surveying system for presenting at least one drill-down question to the participant and recording a response of the participant to the drill-down question in the database, said presenting of said at least one drill-down question occurring only if the first core item response meets the first specified criterion,
   using the computerized surveying system for automatically interpreting the response to the drill-down question for being within a predetermined acceptable response range, and using the computerized surveying system for presenting at least one verbatim question to the participant and recording a verbal response of the participant in the database, said presenting of said at least one verbatim question occurring only if the drill-down response is not within the predetermined acceptable response range;

using the computerized surveying system for presenting a second core item question and recording a response to the second core item question; and using the computerized surveying system for automatically compiling and presenting a survey report to a user within 24 hours of said initiating, said survey report utilizing the answers collected from said survey participant for said report.

6. A method using a computerized survey system including at least one computer for collecting survey information, said method comprising the steps of:

using the computerized survey system for providing a list of core item questions about a product, a service, or a product and a service with which the survey participant has experience;

using the computerized survey system for providing a list of drill-down questions, wherein each one of said drill-down questions is associated with one or more of said core item questions and/or is associated with one or more different ones of said drill-down questions;

using the computerized survey system for providing a list of verbatim questions, wherein each one of said verbatim questions is associated with one or more of said core item questions and/or is associated with one or more of said drill-down questions;

using the computerized survey system for contacting a survey participant;

one of a plurality of agents using the computerized survey system for requesting that the participant participate in an automated survey;

if the participant agrees to participate in said automated survey, using the computerized survey system for conducting an automated survey including the steps of:

using the computerized survey system for automatically presenting one or more of said core item questions to the survey participant;

using the computerized survey system for automatically storing an answer of the survey participant to said one or more of said core item questions in a database, wherein said recording includes voice recognition of said answer prior to said recording;

using the computerized survey system for automatically presenting at least one of said drill-down questions to the survey participant only if said answer of the participant to a prior presented core item question or a prior presented drill-down question associated with said at least one drill-down question meets a specified criterion;

using the computerized survey system for automatically storing an answer of the survey participant to said at least one drill-down question in said database, wherein said recording includes voice recognition of said answer prior to said recording;

using the computerized survey system for automatically presenting at least one of said verbatim questions to the survey participant only if said answer of the participant to a prior presented core item question or a prior presented drill-down question associated with said at least one verbatim question meets a specified criterion;

using the computerized survey system for automatically recording a verbal answer of the survey participant to said at least one verbatim question and storing said recording in said database, wherein said recording is a literal recording of the participant's spoken answer;

using the computerized survey system for automatically transferring from said automated survey to a manual survey if one or more of (1) the participant requests an agent, (2) the participant fails to respond to a question, and (3) an answer given by the participant meets at least one specified criterion;

if the participant does not agree to an automated survey, using the computerized survey system for requesting the participant to participate in said manual survey, or if transferred from said automated survey, using the computerized survey system for conducting said manual survey, wherein said manual survey utilizes the automated survey method except that said questions are first automatically presented to one of the agents and then provided by said one of the agents to the participant; and using the computerized survey system for using said answers in said database for generating a survey report, wherein said report includes playing back said verbal answer of the survey participant.

7. The method of claim 6, wherein none of the answers provided by the participant are provided using a touch-tone system.

8. The method of claim 6, further comprising the steps of:
automatically compiling said answers into said survey report; and
presenting said survey report to an authenticated user of said system.

9. The method of claim 6, wherein all of the answers provided by the participant are provided orally and wherein all of said answers except answers to said verbatim questions are interpreted by using automated voice recognition.

10. A method of using a computerized surveying system including at least one computer for collecting and managing survey data comprising the steps of:

using the computerized surveying system for initiating a process of establishing communication with a survey participant, wherein said survey participant is randomly selected from a pool of potential participants who had been provided a product or service within 72 hours of said initiating by the computerized surveying system;

using the computerized surveying system for presenting said survey participant with a survey including at least one verbatim question and recording a verbal response of the participant to said verbatim question for storing in a database, said presenting of said at least one verbatim question occurring only if the response to a previous question is not within a predetermined acceptable response range;

using the computerized surveying system for automatically compiling and presenting a survey report to a user within 24 hours of said initiating, said survey report including playing said recorded verbatim response to the user.

* * * * *

UNITED STATES PATENT AND TRADEMARK OFFICE
CERTIFICATE OF CORRECTION

PATENT NO. : 7,606,726 B2
APPLICATION NO. : 09/871279
DATED : October 20, 2009
INVENTOR(S) : Eugene C. Nelson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1280 days.

Signed and Sealed this

Twelfth Day of October, 2010

David J. Kappos
*Director of the United States Patent and Trademark Office*